Nov. 10, 1959    G. MONIZ ET AL    2,911,701
BLOCK MOLDING MEANS
Filed Feb. 26, 1954    4 Sheets-Sheet 2

INVENTORS.
GILE MONIZ
ADLEIN MONIZ
BY Emery, Booth, Townsend, Miller & Weidner
Attys.

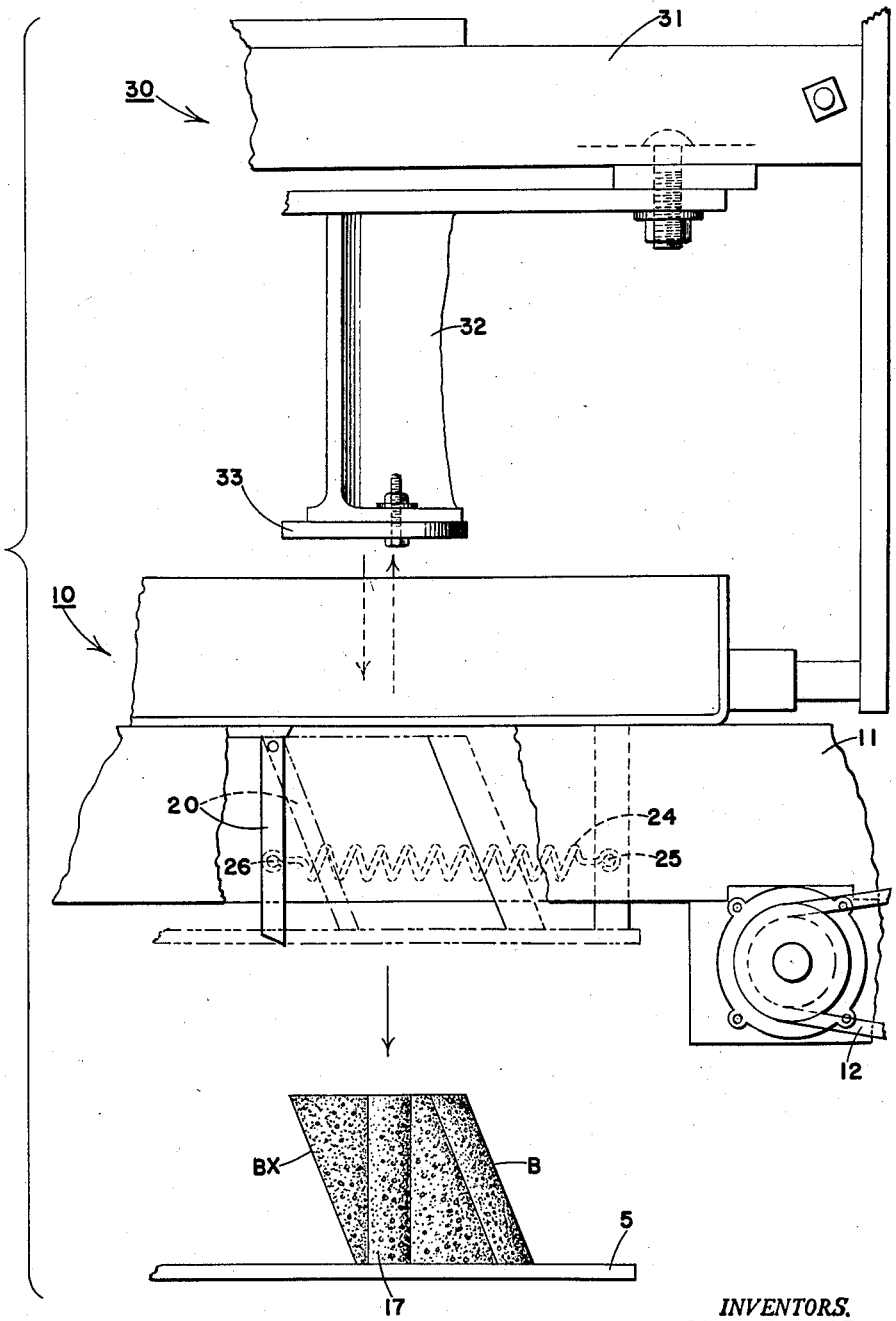

2,911,701

BLOCK MOLDING MEANS

Gile Moniz and Adlein Moniz, Falmouth, Mass.

Application February 26, 1954, Serial No. 412,709

2 Claims. (Cl. 25—41)

Our present invention relates to the molding of blocks and the like cement, concrete, clay and such products for use in buildings, walls and structures in general. More particularly it aims to provide new and improved means for the rapid and efficient production of such molded building units of non-rectangular cross-section, having one or more lateral faces or face portions inclined to the vertical and presently laterally protuberant or overhung wall areas.

Typical machines of the general class here concerned are shown in Patents Nos. 1,699,218 of January 15, 1929, 2,319,291 of May 18, 1943, and 2,566,787 of September 4, 1951. The present invention, however, is applicable generally to the machines of the class there illustrated, being adaptable for installation in and practice with the various existing block-molding machines employing mold boxes and block-supporting pallets with provision for relative vertical movement as between the mold box and the pallet for stripping the molded products or block units.

In the drawings showing one embodiment of means illustrative of the invention and for practicing the method thereof:

Fig. 6 is a similarly expanded view of the parts of Fig. 5 but in side elevation and including certain supporting parts.

Figure 1:
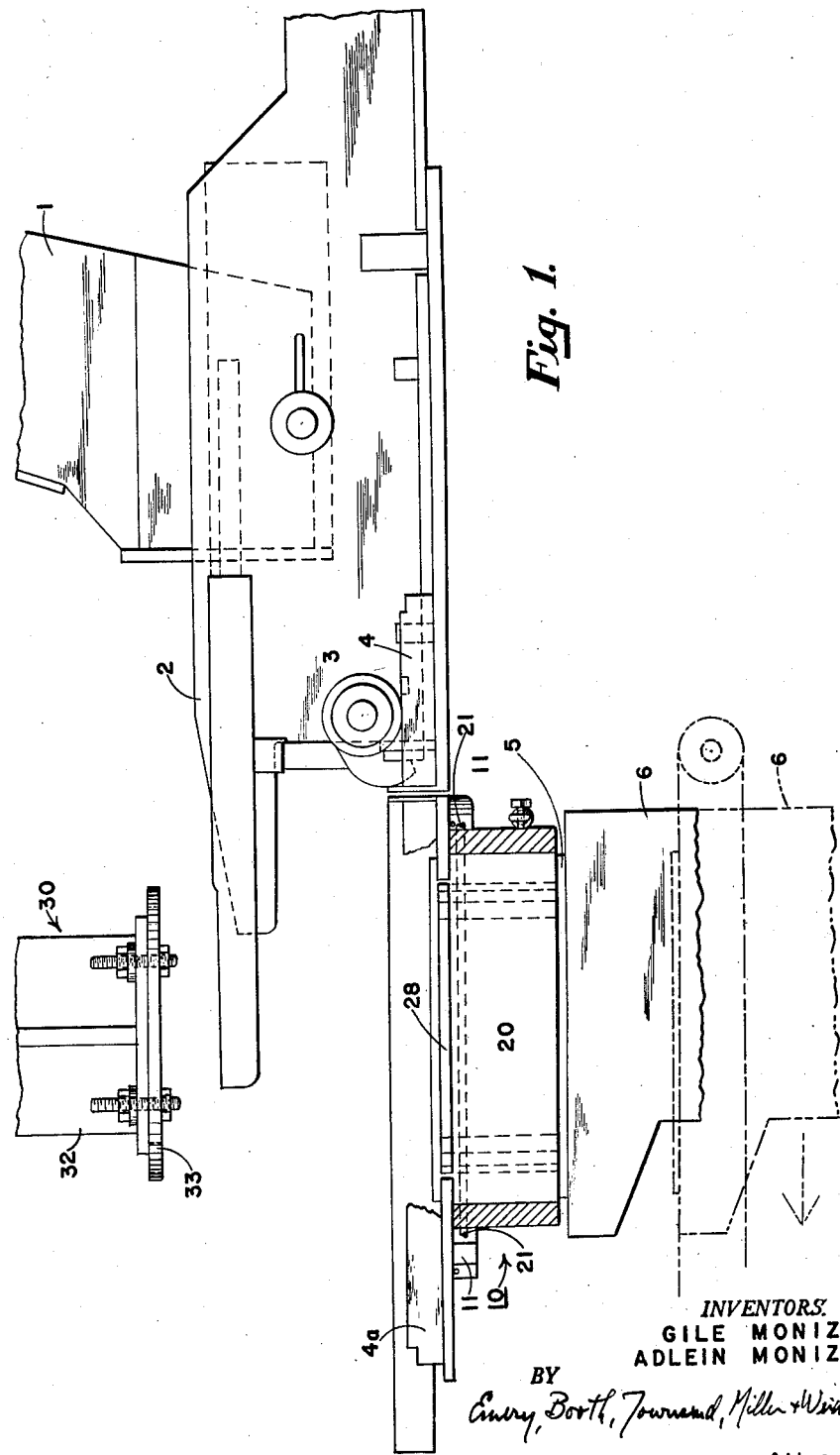
Fig. 1 is a side elevation of the main elements at the molding station of a block-molding machine, with the mold box in vertical section.

Referring to the drawings in more detail, noting particularly Fig. 1, the block-molding machine selected for illustration has a hopper 1 opening into a feed pan 2, the hopper receiving the cement, concrete or other molding material from a mixer, not shown. The feed pan is equipped with rollers 3 running on track members 4, 4a for travel of the feed pan to and from mold-filling position in the known manner. The feed pan 2 is shown partly retracted toward the rear of the machine, that is, toward the right in Fig. 1.

In the full-line showing in Fig. 1 an imperforate pallet 5 is supported in elevated position on the so-called anvil bars 6, these being vertically reciprocable elements as for example in said Patent 2,566,787 whereby the given pallet 5 is moved up into bottom-closing engagement with the mold box 10 and subsequently is lowered to deposit the pallet with the molded block units E thereon onto the pallet conveyor 7. The latter advances the loaded pallets for delivery at the front of the machine, toward the left in Fig. 1, and generally at the same time brings foward another empty pallet into position below the mold box.

Figure 2:
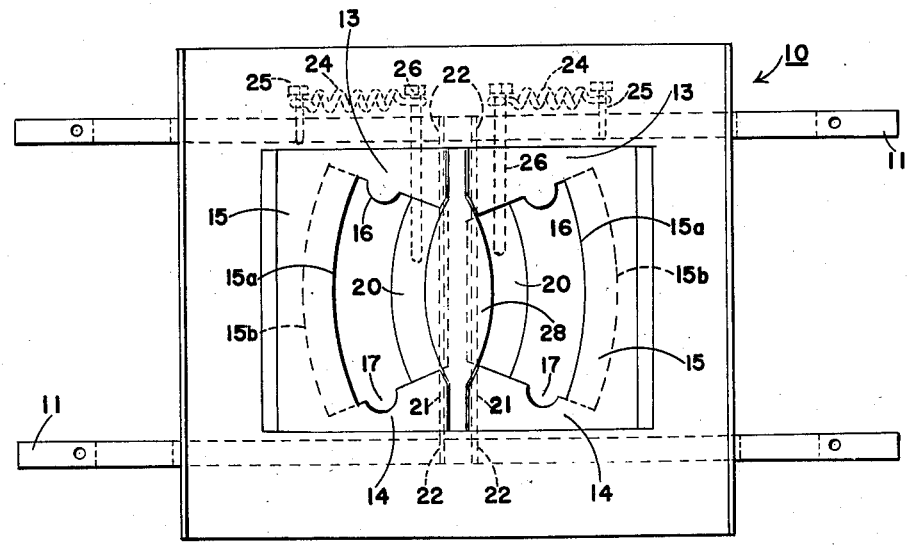
Fig. 2 is a top plan of the mold box separately.
Figure 3:
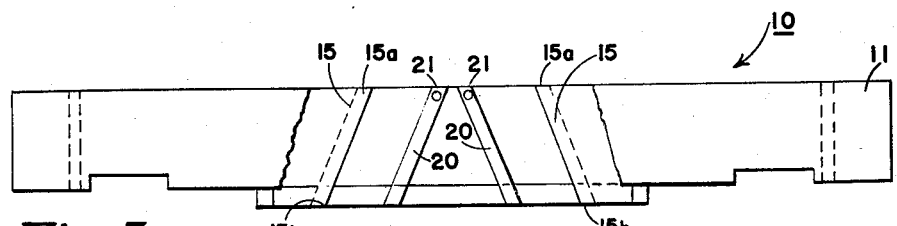
Fig. 3 is a side elevation corresponding to Fig. 2 and broken away centrally to expose the interior of the box.
Figure 4:
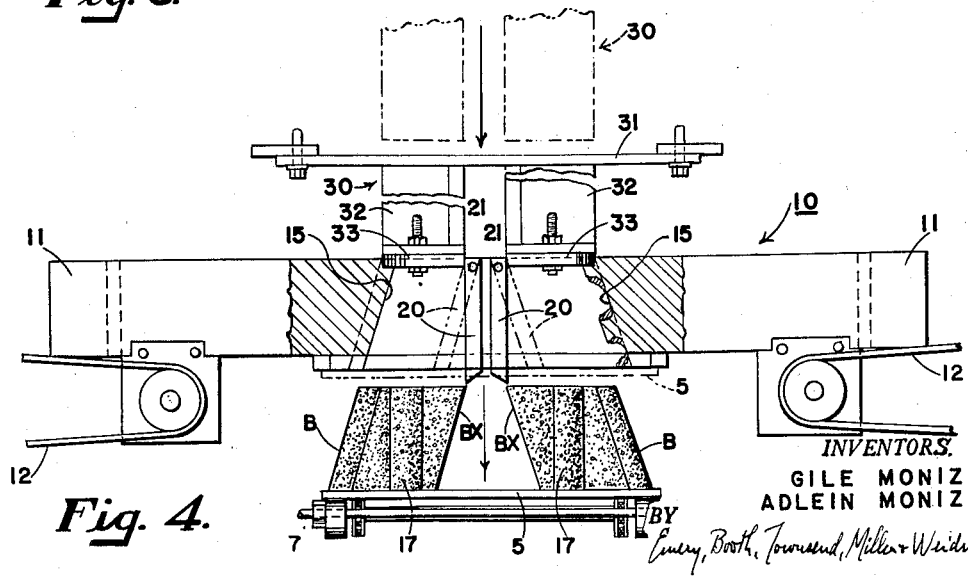
Fig. 4 is a front elevational view of the mold box, stripper head and pallet conveyor with two molded units or blocks deposited on the pallet.

The mold box is designated generally at 10 and comprises a frame or platform having suitable supports 11, see Figs. 2 to 4, adapting it to be vibrated in known manner during delivery of a charge into it from the feed pan 2, portions of the vibratory means being indicated at 12, 12 in Figs. 4 and 6. The main elements at the molding station further comprise a stripper head designated generally at 30. It includes a vertically reciprocable support 31 having as many legs 32 as there are mold unit cavities in the mold box. Each stripper leg replaceably carries in horizontal position at the lower end a stripper plate 33 conformant in shape and size to the horizontal top face of the mold unit or work piece B and serving a new and additional function in the practice of the present invention as will be explained. It is to be borne in mind that the relative movement as between the stripper head and the mold box, also between the latter and the pallet, for compacting and stripping purposes as is customary in block-molding machines is a direct straight-line vertical movement of the parts concerned, however accomplished. The invention is equally applicable to block-molding machines of the type wherein the pallet is operatively positioned at a given level and the mold box is caused to move vertically for block stripping purposes as shown for example in Patent 2,319,291, or of the type employing a stationary mold box with provision for lifting and lowering the pallet and the stripper head as for example in Patent 2,566,787 and as herein represented.

As stated in the introductory paragraph this invention is particularly concerned with the manufacture of special shapes of building blocks, as contrasted with those of the standard rectangular and vertilinear conformation. While machine-made blocks with curved sides are known, so far as we are aware the top and bottom faces of any such blocks as well as all horizontal sections thereof have heretofore always been in directly superposed relation; that is, perpendiculars through any portion of the block intersect both the top and the bottom faces. Other blocks have been somewhat truncate or upwardly tapered, having the bottom face of greater area than the top face and with no laterally protuberant portion at any level of the block extending outside the vertically projected area of the bottom face of the block.

In accordance with the present invention rapid machine manufacture upon existing types of block-molding machines is now made possible for blocks having upper laterally projective or overhung portions. These include for example such shapes as the exemplary block units B herein illustrated of rhombus or rhomboid shape viewed endwise or in cross-section. Blocks having such overhung or laterally protuberant upper portions are importantly useful for example as arch blocks for the upper courses of cylindrical and other tank-like structures such as cisterns, cesspools, well walling and the like, for reducing the wall diameter toward the top of the structure and to adapt it for reception of a cover of manipulable size, such as a manhole coverplate. That is, blocks as here concerned are particularly useful to build walls having an incline or batter, to either side of the vertical. Such blocks, not heretofore produced by automatic machine manufacture or in continuously cycling apparatus may for convenient reference be termed batter blocks, i.e. having a lateral wall inclined to the vertical to present a batter face.

Automatic machine production of such laterally projective or overhung block units is attained under the present invention by the provision for bodily displacement of the lateral wall of the mold cavity at any face or faces of the block unit which are to have the overhung formation. Such mold wall is automatically bodily displaced during the stripping stage of the molding operation and is thereafter automatically returned to normal or molding position in readiness for the next molding cycle.

Accordingly, referring again to the drawings, the mold box 10 comprises the conventional or preferred frame within which the mold cavity lateral liner walls are removably installed. To facilitate description the mold walls generally transverse to the direction of pallet travel are referred to as end walls, while those extending in the general direction of travel of the pallets are termed side walls. In the illustrated example but two cavities are shown, with the major dimension for each of the pair of block units extending fore and aft of the machine. It will be understood that any desired number of cavities may be provided and these may be disposed with the length of the blocks extending otherwise than as shown.

Referring to Fig. 2 the removable liner walls or forms for the mold unit cavities of the mold box 10 comprise for each cavity opposite end walls 13 and 14 and a side wall 15, these herein for identification being called fixed walls. They may be fashioned separately and bolted or otherwise demountably installed in the mold box or they may be welded or otherwise secured together for handling as a unit or may be cast or otherwise fabricated in one piece. The fixed side wall 15 may be planar but in the illustrated example is longitudinally arced and the fixed end walls 13, 14 stand in general radial relation to it, for molding blocks with segmental sector-shaped top and bottom faces as appropriate to the building of cylindrical or curved structure walls as for cesspools, cisterns and the like. The invention however is not limited to any given angular relation as between the end and side walls. Provision may be made as shown for interlocking formations on the blocks, such as a vertical rib at one end and a corresponding groove at the opposite end. Accordingly the cavity end walls 13 and 14 are formed with vertical groove-forming ribs 16 and conformant rib-forming grooves 17, at the opposite ends respectively. These result in the formation of the similarly numbered rib and groove interlocks at the end faces of the molded units or blocks B; see Figs. 4, 5 and 6.

Each mold cavity of the mold box 10 herein further comprises and is laterally completed by a movable wall 20 constituted as a movable plate. As previously stated, the mold units or blocks B of the invention are non-rectangular and non-vertilinear with respect to at least one lateral face so as to present a laterally protuberant or overlying portion thereat. This is herein accomplished through the medium of the movable wall plate 20. This movable cavity-wall element 20 as shown is arced lengthwise so that its top and bottom edges parallel those of the fixed side wall 15. It is also shaped and positioned so that in normal or molding status the molding face thereof inclines downwardly and inwardly toward the body of the block. Hence in the resultant molded blocks B there is a laterally protuberant and overhung portion BX, Figs. 4 and 6.

The other longitudinal side face of the blocks, that defined by the fixed side walls 15 already described may be vertical or may be inclined in general parallelism with the opposite side face defined by the movable wall 20. In the illustrated example the two longitudinal and in this instance curved side faces of the blocks B are substantially parallel throughout, both being inclined from the vertical, giving a rhombus or rhomboid shape to the blocks as viewed endwise or in vertical cross-section. Accordingly the mold face of the fixed side wall 15, again noting Fig. 2, also 3 and 4, is undercut and inclined downwardly and outwardly, away from the block body, from the top longitudinal edge 15a to the bottom longitudinal edge 15b.

Otherwise stated, the horizontal top and bottom faces of the block units B are laterally offset with respect to each other and at least at one side face, that defined by the movable cavity wall 20, there is an overhang or protuberance BX which if projected down onto the surface containing the block bottom face will lie outwise the area of the latter.

As explained the laterally protuberant or overhung blocks of the invention are novelly adapted for production in the existing types of block-molding machines. The latter typically require the stated straight-line relative vertical motion as between the mold box on the one hand and the pallet and stripper means on the other hand, for stripping of the work from the mold. The movable walls 20 of the cavity-defining forms, namely those which produce the overhung block portions BX accordingly are mounted and arranged to accommodate such vertical stripping action despite said overhung and apparently interferent portions BX of the block units.

This capacity for bodily movement or lateral retraction of the movable walls 20 may be variously afforded. Conveniently and as herein shown provision is made for horizontal pivotal mounting of the walls 20 at the upper portions. In the illustrated example such pivotal support comprises a hanger shaft or rod 21 at the top edge portion of each movable plate 20 and projecting longitudinally at the respective ends of the plate sufficiently for supporting engagement with the transverse walls of the mold box 10 as at 22, 22 in the several figures. It will be understood that such horizontal pivotal bearing support, whereby the overhang-producing plates 20 may swing bodily laterally away from the corresponding cavity, may be variously provided. The pivot elements 21 for example may be in the nature of studs fixed to the plates and swivelling in bearings on the frame or may be fixed on the frame and received in bearing apertures in the plates.

The space above and between the movable walls 20 of adjacent cavities is occupied by a spacer or filler piece 28 at the table level of the mold box and mounted thereon or on the cavity end wall forms 13, 14. If desired the pivotal support for the swingable walls 20 may be carried by said filler piece 28, facilitating removal and replacement of the cavity-forming parts.

Figure 5:
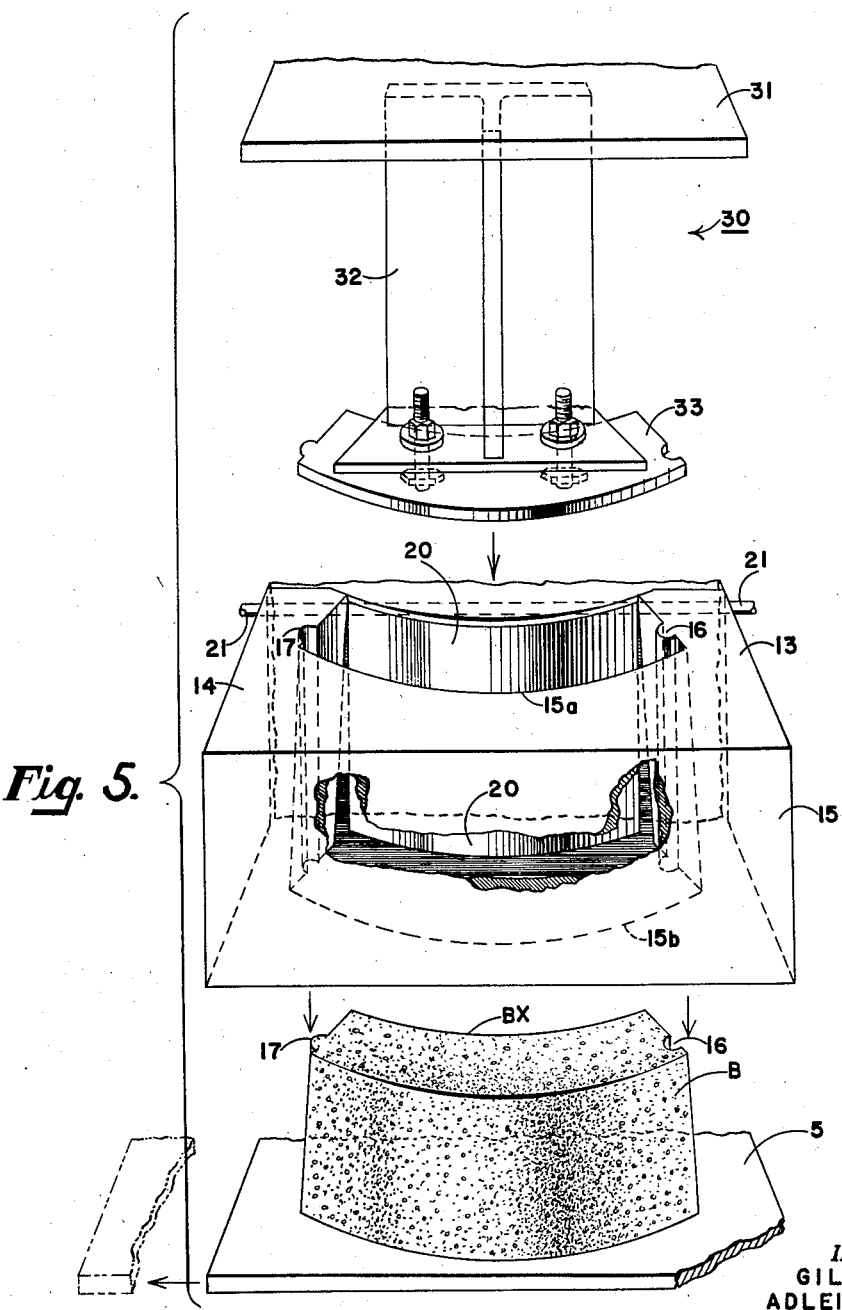
Fig. 5 is an exploded perspective and partially phantom view of vertically aligned portions of the mold box, pallet and stripper head, with the parts abnormally spaced vertically for clearer delineation.

Suitable means also is provided for holding the movable plates 20 in and returning them to the normal or mold-closing inclined position as shown in full line in Figs. 2 and 3 and dotted in Figs. 4 and 6, while permitting them at the appropriate time to be swung to free stripping or vertical position as shown in full line in Figs. 4, 5 and 6. Such means as illustrated in Figs. 2 and 6 by way of example comprises for each movable plate 20 a coil spring 24 fixed at one end to the mold box frame as at 25 and at the opposite end to a pin 26 projecting longitudinally from the corresponding plate 20 and through a slot or the like in the mold box frame. The strength of the springs 24 is calculated as required to shift the wall plates 20 to closed position and so retain them during the filling and compacting stages of each molding operation.

It will be noted also that the bottom margins of the movable cavity wall plates 20 in the mold-closing position are engaged by the pallet 5 and thereby additionally firmly held, particularly in view of the swivelling mount and the angular relation of the walls, necessitating that the bottom edge of the plates descend lower than is permitted by the raised pallet, in order to shift to the open or stripping position; compare the dotted and the full-line positions of the movable wall elements 20 in Fig. 4.

In operation, assume that a pallet 5 has been presented below and elevated into closing position at the bottom of the mold box 10 as in Fig. 1. The movable cavity walls 20 accordingly are in closed position, noting also Figs. 2 and 3. With the stripper head 30 elevated, Fig. 1, the feed pan 2 is advanced, to the left in Fig. 1, over the mold box to introduce a filling quantity of the cement, concrete or other molding material into the underlying mold cavities. The feed pan is then retracted and the stripper head 30 is lowered sufficiently to compact the material in the molds, preferably with attendant vibration of the mold box in the known manner.

Thereafter the relative vertical motion as between the mold box on the one hand and the pallet and the stripper head on the other hand is accomplished. As stated, in the machine selected for illustration the pallet and the stripper head are lowered while the mold box remains vertically at rest. As the horizontal plates 33 of the stripper head, having the contour of the top face of the blocks, begin to move down through the mold cavities in the mold box they engage and cam the corresponding movable walls 20 to the open position as shown in full line in Figs. 4 and 6. Accordingly a vertical path is opened below the protuberant or overhung portions BX of the block units, permitting them to be stripped straight down in vertical line as they are lowered with the pallet 5 to the position represented in Figs. 4, 5 and 6.

In Fig. 4 the completed blocks B—BX are shown in the fully stripped position with the pallet 5 resting on the pallet conveyor 7. The stripper head 30 in the full-line showing of Fig. 4 is in the partly lowered position as at the time of opening engagement with the cavity walls 20 and also as at the stage of partial upward retraction following the vertically downward release of the blocks, it being understood that in the course of the stripping operation the plates 33 of the stripper head are carried down through or substantially through the mold cavities.

From the foregoing it will be apparent that the method of the invention includes the novel step of bodily laterally moving a wall or walls of a mold cavity having provision for formation of an overhang at the corresponding face of the work piece or mold unit, during and attendant on relative movement of the mold and the pallet for stripping purposes and in such manner that any protuberance or overhang at a face or faces of the molded work unit is cleared for direct straight line vertical stripping of the mold units from the mold. The disclosed lateral shifting of a mold cavity wall or walls within the confines of the mold box 10 and whereby the work unit is thus cleared for straight-line vertical stripping is herein referred to as clearing or clearance-affording movement of such wall. As further evident from the foregoing description in connection with the drawings such method may be practiced with and the means therefor may readily be installed in existing automatic building-block-molding machines. The invention accordingly now for the first time makes possible the efficient quantity manufacture of laterally protuberant or overhung blocks such as the arcuate arch blocks B here shown in the drawings by way of example. This contrasts with the prior laborious and expensive procedure of individually manually fashioning such blocks in an essentially hand-tailored fashion.

While the blocks as shown in the drawings are solid, the invention is equally applicable to the production of cored blocks of the protuberant or overhung formation concerned. Should coring be desired mold cores and core-supporting bars or the like may be installed in association with the mold box as for example in Patent 2,566,787 mentioned and as well illustrated in Patent 2,587,413 of February 26, 1952.

It will also be understood that in a given installation of cavity forms in the mold box the lengths and also the curvatures of the two or more block-unit cavities may be varied as between the individual cavities, to form mold units or blocks of different lengths as appropriate for different courses of decreasing diameter at the upper portion of cylindrical structures such as cesspools, cisterns and the like.

Our invention, to the means, is not limited to the exemplary embodiment herein illustrated and described, and we set forth its scope in our following claims.

We claim:

1. In apparatus for the automatic molding of cement and like blocks in a repeat cycling operation, a mold box presenting cavity-defining lateral walls, a stripper head receivable in the cavity under movement of the mold box and said stripper head relative to each other, and a pallet support below the mold box, said mold box having a lateral wall laterally movable between an inclined closed position defining a protuberant batter-forming mold cavity portion and an open stripping position normal to the pallet, said movable wall constructed and supported for said lateral movement in the mold box to said open position under direct thrusting engagement of the stripper head therewith under relative movement of the mold box and the head thereby to accommodate rectilinear stripping of the resultant batter block from the mold box.

2. In a continuously cycling block-molding machine, a mold box having cavity-defining lateral walls, a stripper head above the box, a pallet support below the box, means for relatively moving the mold box cavity walls and the stripper head in a straight vertical path telescopingly past each other through substantially the depth of the mold cavity to strip a molded block and oppositely to return for the next molding operation, at least one lateral wall of the mold box being inclined to the vertical to define an overhung batter-faced mold cavity portion, pivot means on the mold box supporting said wall for opening swinging movement away from and opposite closing movement toward the stripping path, and the stripper head having a marginal portion for direct lateral outthrusting engagement with said wall to effect said opening movement thereof and under opposite relative movement of the cavity walls and stripper head to permit said closing movement of said swingable wall.

References Cited in the file of this patent

UNITED STATES PATENTS

| 330,013 | Gillham | Nov. 10, 1885 |
| 648,341 | Bock | Apr. 24, 1900 |
| 776,794 | Peabody | Dec. 6, 1904 |
| 785,093 | Fox | Mar. 21, 1905 |
| 810,300 | Pettit et al. | Jan. 16, 1906 |
| 833,010 | Thomas et al. | Oct. 9, 1906 |
| 1,086,994 | Cathriner | Feb. 10, 1914 |
| 1,109,142 | Passage | Sept. 1, 1914 |
| 1,570,618 | Cotton | Jan. 26, 1926 |
| 1,776,888 | Clark | Sept. 30, 1930 |
| 1,921,003 | Romie | Aug. 8, 1933 |
| 1,936,216 | Straub et al. | Nov. 21, 1933 |
| 2,298,446 | White | Oct. 13, 1942 |
| 2,305,112 | Scott | Dec. 15, 1942 |
| 2,425,004 | Rabell | Aug. 5, 1947 |
| 2,427,044 | Burns | Sept. 9, 1947 |
| 2,479,207 | Buttress | Aug. 16, 1949 |
| 2,532,049 | Wittke | Nov. 28, 1950 |
| 2,602,269 | Wilcock | July 8, 1952 |
| 2,710,492 | Wilcock | Jan. 14, 1955 |

FOREIGN PATENTS

| 582,834 | Great Britain | Nov. 28, 1946 |